(12) United States Patent
Pai et al.

(10) Patent No.: US 7,767,109 B2
(45) Date of Patent: Aug. 3, 2010

(54) LIQUID CRYSTAL MEDIUM FOR POLYMERIZATION ALIGNMENT PROCESS AND METHOD FOR MANUFACTURING A LIQUID CRYSTAL DISPLAY HAVING THE SAME

(75) Inventors: Chia-Hsuan Pai, Hsin-Chu (TW);
Chung-Ching Hsieh, Hsin-Chu (TW);
Te-Sheng Chen, Hsin-Chu (TW);
Sugiura Norio, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 219 days.

(21) Appl. No.: 12/055,282

(22) Filed: Mar. 25, 2008

(65) Prior Publication Data
US 2009/0056853 A1 Mar. 5, 2009

(30) Foreign Application Priority Data
Sep. 5, 2007 (TW) .............................. 96133062 A

(51) Int. Cl.
*C09K 19/00* (2006.01)
*C09K 19/06* (2006.01)
*C09K 19/52* (2006.01)

(52) U.S. Cl. .............................. 252/299.01; 252/299.1; 252/299.6; 430/20; 428/1.1; 428/1.3

(58) Field of Classification Search ............ 252/299.01, 252/299.1, 299.6; 430/20; 428/1.1, 1.3
See application file for complete search history.

(56) References Cited

U.S. PATENT DOCUMENTS

2005/0134790 A1 6/2005 Inoue et al.
2006/0182897 A1 8/2006 Saito

FOREIGN PATENT DOCUMENTS

JP 2000-137214 5/2000
WO 2007046384 A1 4/2007

*Primary Examiner*—Geraldina Visconti
(74) *Attorney, Agent, or Firm*—Winston Hsu

(57) ABSTRACT

A liquid crystal (LC) medium for polymerization alignment process includes at least a set of LC molecules, at least a set of reactive monomers, and at least one inhibitor at a concentration in a range of 0.01-1% wt of the reactive monomer. The inhibitor quenches polymerization of radicals of the reactive monomers, which is triggered by light or heat before the polymerization alignment process. Therefore influence on the reactive monomers before the polymerization alignment process is reduced and stability of the LC medium is improved.

25 Claims, 5 Drawing Sheets

LIQUID CRYSTAL MEDIUM FOR POLYMERIZATION ALIGNMENT PROCESS AND METHOD FOR MANUFACTURING A LIQUID CRYSTAL DISPLAY HAVING THE SAME

BACKGROUND OF THE INVENTION

1. Field of the Invention

The present invention relates to a liquid crystal (LC) medium for polymerization alignment process and method for manufacturing a liquid crystal display (LCD) having the same, and more particularly, to a LC medium having inhibitor and method for manufacturing a LCD having the LC medium.

2. Description of the Prior Art

With progression of large size liquid crystal displays (LCDs), a requirement for wider viewing angle is confronted. Therefore multi-domain vertical alignment (MVA) LCD, which possesses advantages such as wider viewing angle and shorter response time, has become a mainstream of the large size LCDs.

In a conventional MVA LCD, a plurality of protrusion is utilized to make the liquid crystal (LC) molecules have a pre-tilt angle. Therefore processes such as thin film deposition, photolithography process, and etching process are needed to form the protrusions, and thus complexity and cost of the fabrication are increased. More serious, the protrusions shades light, reduces aperture ratio of the MVA LCD, and reduces brightness of the MVA LCD.

Therefore, polymerization alignment process is developed to provide polymers used to replace the protrusions and thus to make the LC molecules have the pre-tilt angle in the MVA LCD.

Reactive monomers used in the polymerization alignment process are monomers that can be triggered by light or heat, therefore the reactive monomers may polymerize in process before the polymerization alignment process. For instance, the reactive monomers are adapted to polymerize during an UV light curing process that is used to cure the sealant in advance of the polymerization alignment process. Consequently, the remnant reactive monomers are not sufficient to make the LC molecules have the pre-tilt angle in the polymerization alignment process. Meanwhile, phase separation due to the polymerization additionally affects stability of the LC medium before the polymerization alignment process. More seriously, optics anomaly defects such as mura or image sticking are created in the LCD. In addition, it is well known that the polymerization of the reactive monomers is triggered not only by light or heat in the UV light curing process, but it is also triggered by light from environment when the LCD is in a buffer area in advance of the polymerization alignment process.

To avoid problems described above, many solutions are provided such as providing an additional mask in the UV light curing process, thus light is obstructed from the LC medium. However, the additional mask consequentially increases cost. Furthermore, since the LC medium having reactive monomers is more sensitive than the conventional one, environmental light has to be precisely controlled in the whole LCD fabricating process in order to keep the LC medium from being affected, and to keep its stability. This shows that both cost and complexity of the fabricating process are increased with application of the polymerization alignment process and LC medium used in the polymerization alignment process.

SUMMARY OF THE INVENTION

It is therefore a primary objective of the claimed invention to provide a liquid crystal (LC) medium for polymerization alignment process and method for manufacturing liquid crystal display (LCD) having the LC medium in order to improve stability of the LC medium and to decrease defects created in the LCD.

According to the claimed invention, a LC medium for polymerization alignment process is provided. The LC medium comprises at least a set of LC molecules, at least a set of reactive monomers, and at least one inhibitor at a concentration in a range of 0.01-1% wt of the reactive monomer, wherein the inhibitor comprises at least a compound of formula (1):

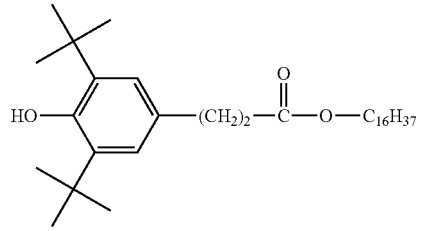

According to the claimed invention, a method for manufacturing a LCD is provided. The method comprises providing an upper substrate and a lower substrate, forming a sealant surrounding on a periphery of a surface of the upper substrate and that of a corresponding surface of the lower substrate, respectively, and filling a LC medium in between the upper substrate and the lower substrate, and performing a polymerization alignment process. The LC medium filled in between the upper substrate and the lower substrate comprises at least a set of LC molecules, at least a set of reactive monomers, and at least one inhibitor in a range of 0.01-1% wt of the reactive monomer, wherein the inhibitor comprises at least a compound of formula (1) as described above.

The inhibitor added in the LC medium is able to reduce influence of light or heat on the LC medium and to prevent the reactive monomer of the LC medium from polymerizing before the polymerization alignment process. Therefore both of the polymerization of the reactive monomer in the polymerization alignment process and stability of the LC medium are improved, and thus display quality of the LCD is improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
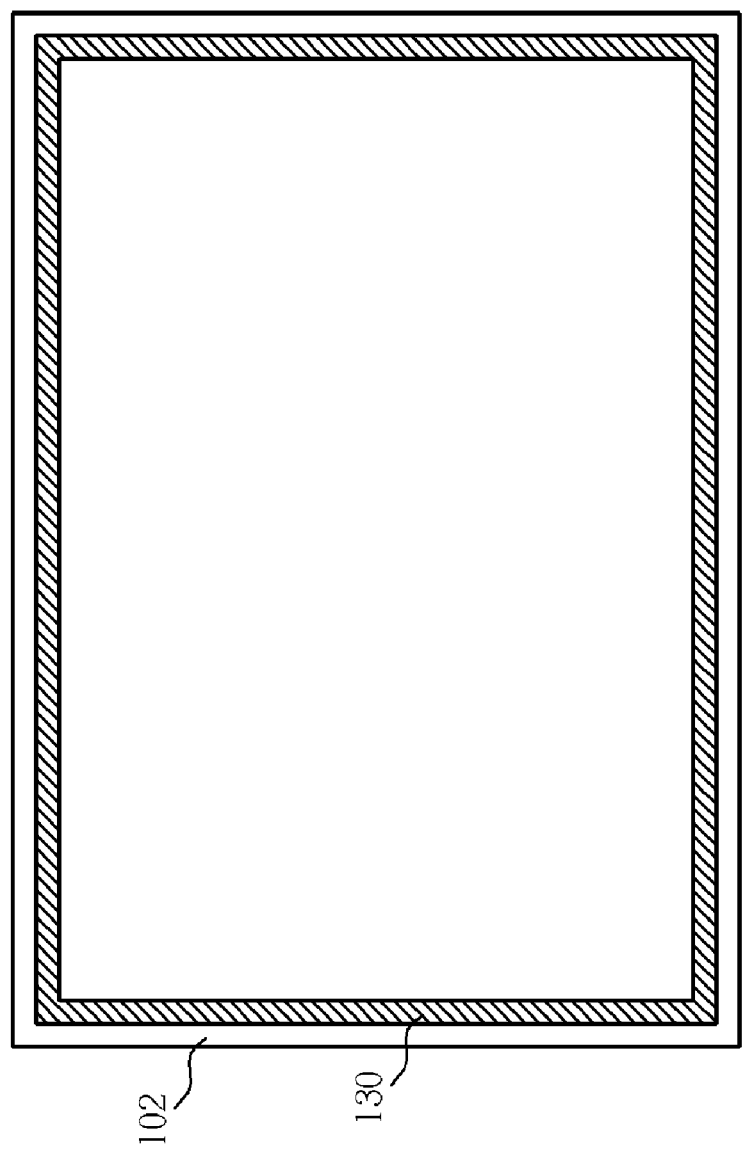
FIGS. 1-4 are schematic drawings for illustrating a method for manufacturing a LCD according to a preferred embodiment of the present invention.
Figure 2:
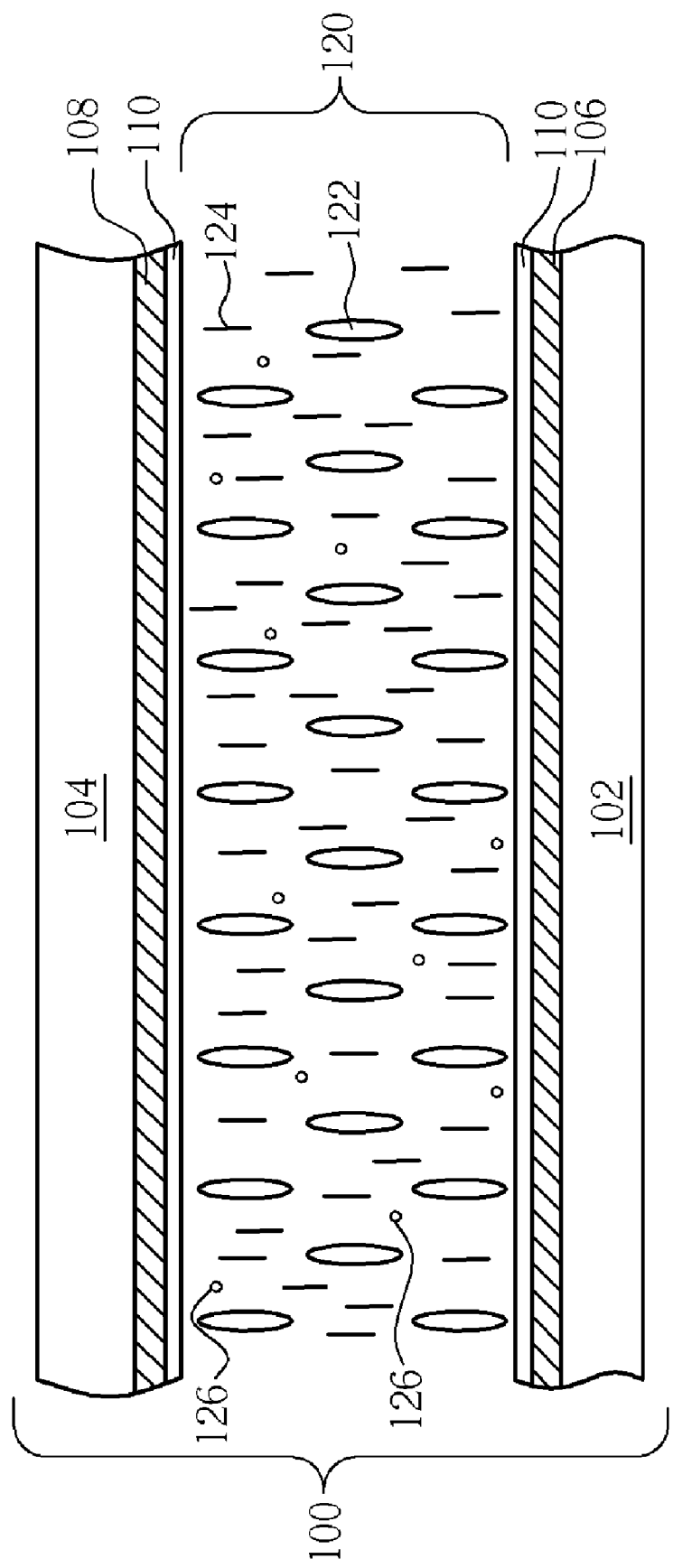

Please refer to FIGS. 1-4, which are schematic drawings for illustrating a method for manufacturing a LCD 100 according to a preferred embodiment of the present invention. The LCD 100 is a MVA LCD, for example. As shown in FIGS. 1 and 2, a lower substrate 102 and an upper substrate 104 are provided. A surface of the lower substrate 102 and a corresponding surface of the upper substrate 104 respectively include conductive layers 106 and 108. The conductive layers 106 and 108 can be pixel electrodes or common electrodes, respectively. An alignment layer 110 composed of polyamide (PI) is selectively formed on surfaces of the conductive layer 106 and 108, respectively. As shown in FIG. 1, a sealant 130 is formed between the lower substrate 102 and upper substrate 104. The sealant 130 is formed surrounding on a periphery of the surface of the lower substrate 102 in a location corresponding to a non-display area of the upper substrate 104, and/or a sealant 130 is also formed on a periphery of the surface of the upper substrate 104 in a location corresponding to a non-display area of the lower substrate 102. Since the corresponding location where the sealant 130 formed on the upper substrate 104 is identical to that on the lower substrate 102, the detailed drawing is omitted in the interest of brevity. Next, a LC medium 120 is filled in between the lower substrate 102 and the upper substrate 104 by a liquid crystal injection process or a one drop fill (ODF) process. The ODF process can be performed with pressure, motors, or others similar ways of applying the theorem of injector or ink jet. After the LC medium 120 is filled in the sealant 130 formed on the lower substrate 102, the upper substrate 104 is assembled onto the lower substrate 102 by a substrate assembling process, followed by a sealant curing process used to cure and harden the sealant 130.

According to the preferred embodiment of the present invention, the LC medium 120 comprises at least a set of LC molecules 122, at least a set of reactive monomers 124, and a set of inhibitors or at least one inhibitor 126 at a concentration in a range of 0.01-1% wt or 100 ppm-1% wt (weight percentage) of the reactive monomer 124. And the inhibitor 126 comprises at least a compound of formula (1) as described above, but is not limited thereto.

The reactive monomer 124 of the LC medium 120 is a photo-polymerizable reactive monomer or a thermal-polymerizable reactive monomer, and it comprises compound of formula (2) or (3):

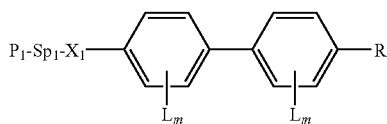
(2)

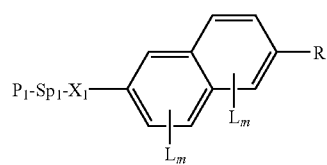
(3)

$P_1$ of the formulas (2) and (3) independently is a polymerizable group such as acrylate or methacrylate. $SP_1$ independently is a spacer group or a single group. $X_1$ independently is —O—, —S—, —OCH$_2$—, —CO—, —COO—, —OCO—, —CO—N$^O$R—, —N$^O$R—CO—, —OCH$_2$—, —SCH$_2$—, —CH$_2$S—, —CH=CH—COO—, —OCC—CH=CH—, or a single bond. $L_m$ independently is F, Cl, CN, alkyl having 1 to 7 carbon atoms, alkylcarbonyl having 1 to 7 carbon atoms, alkoxycarbonyl having 1 to 7 carbon atoms, or alkylcarbonyloxy having 1 to 7 carbon atoms, and $_m \geq 1$. When $L_m$ is an alkyl having 1 to 7 carbon atoms, alkylcarbonyl having 1 to 7 carbon atoms, alkoxycarbonyl having 1 to 7 carbon atoms, or alkylcarbonyloxy having 1 to 7 carbon atoms, one or a plurality of its hydrogen atoms is replaceable with fluorine atom or chlorine atom. R independently is —H, —F, —Cl, —CN, —SCN, —SF$_5$H, —NO$_2$, single bond having 1 to 12 carbon atoms, branched-chain alkyl having 1 to 12 carbon atoms, or —X$_2$-Sp$_2$-P$_2$. Wherein X$_2$ is independently —O—, —S—, —OCH$_2$—, —CO—, —COO—, —OCO—, —CO—N$^O$R—, —N$^O$R—CO—, —SCH$_2$—, —CH$_2$S—, —CH=CH—COO—, —OOC—CH=CH—, or a single bond and Sp$_2$ is independently a spacer group or a single group. P$_2$ is independently a polymerizable group such as acrylate or methacrylate. When R is —X$_2$-Sp$_2$-P$_2$, it is understandable that X$_2$ is corresponding to X$_1$, Sp$_2$ is corresponding to Sp$_1$ and P$_2$ is corresponding to P$_1$.

The LC molecules 122 can be negative liquid crystal molecules, and comprise compound of formula (4), (5), or (6), and (7):

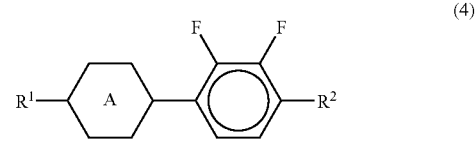
(4)

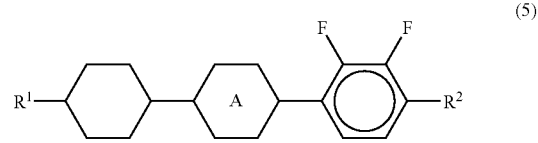
(5)

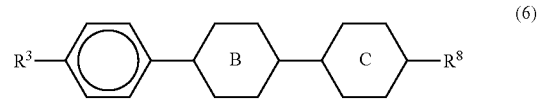
(6)

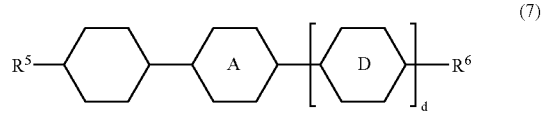
(7)

$R^1$, $R^2$, $R^3$, $R^4$, and $R^6$ independently are an alkyl having 1 to 12 carbon atoms, in which 1 or 2 non-adjacent CH$_2$ group of the alkyl is replaceable with —O—, —CH=CH—, —CO—, —OCO—, or —COO—, in such a way that oxygen atoms are not linked directly to one another. $R^5$ is alkenyl having 2 to 8 carbon atoms. And d is 0 or 1. In addition,

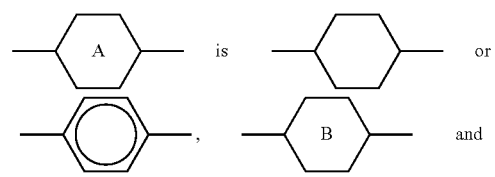

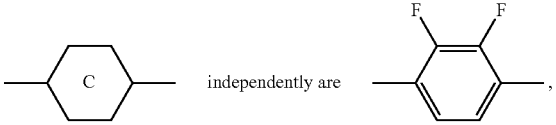

-continued

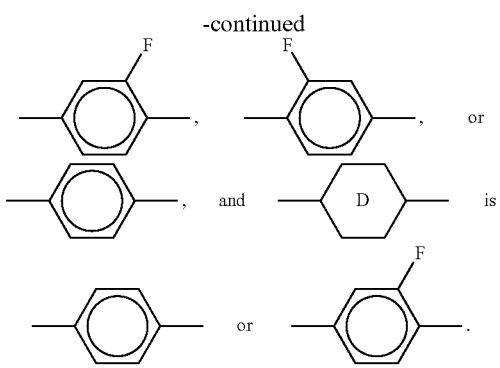

Additionally, the LC medium 120 can further comprise an initiator (not shown) that is highly sensitive to light or heat and possesses superior stability.

In the preferred embodiment, the LC medium 120 is filled in between the upper substrate 104 and the lower substrate 102 by an ODF process. Then, a sealant curing process is performed to cure and harden the sealant 130. The sealant curing process is performed by applying the LCD 100 with heat or light, thus the sealants 130 formed between the upper substrate 104 and the lower substrate (shown in FIG. 1) are cured and hardened. According to the preferred embodiment, although the LC medium 120 is exposed to heat or light during the sealant curing process, free radicals generated from the reactive monomers 124 will preferably react with and consume the inhibitors 126, therefore polymerization of the reactive monomers 124 is quenched and prevented. Consequently, influence upon the reactive monomers 124 during the sealant curing process is reduced. In addition, when the LCD 100 is passed into a buffer area in advance of the polymerization alignment process, influence upon the reactive monomers 124 from environmental light in the buffer area is also reduced due to existence of the inhibitors 126. Simply speaking, the reactive monomers 124 of the LC medium 120 are prevented from polymerizing and thus stability of the LC medium 120 is improved due to the inhibitors 126 added in the LC medium 120.

Figure 3:
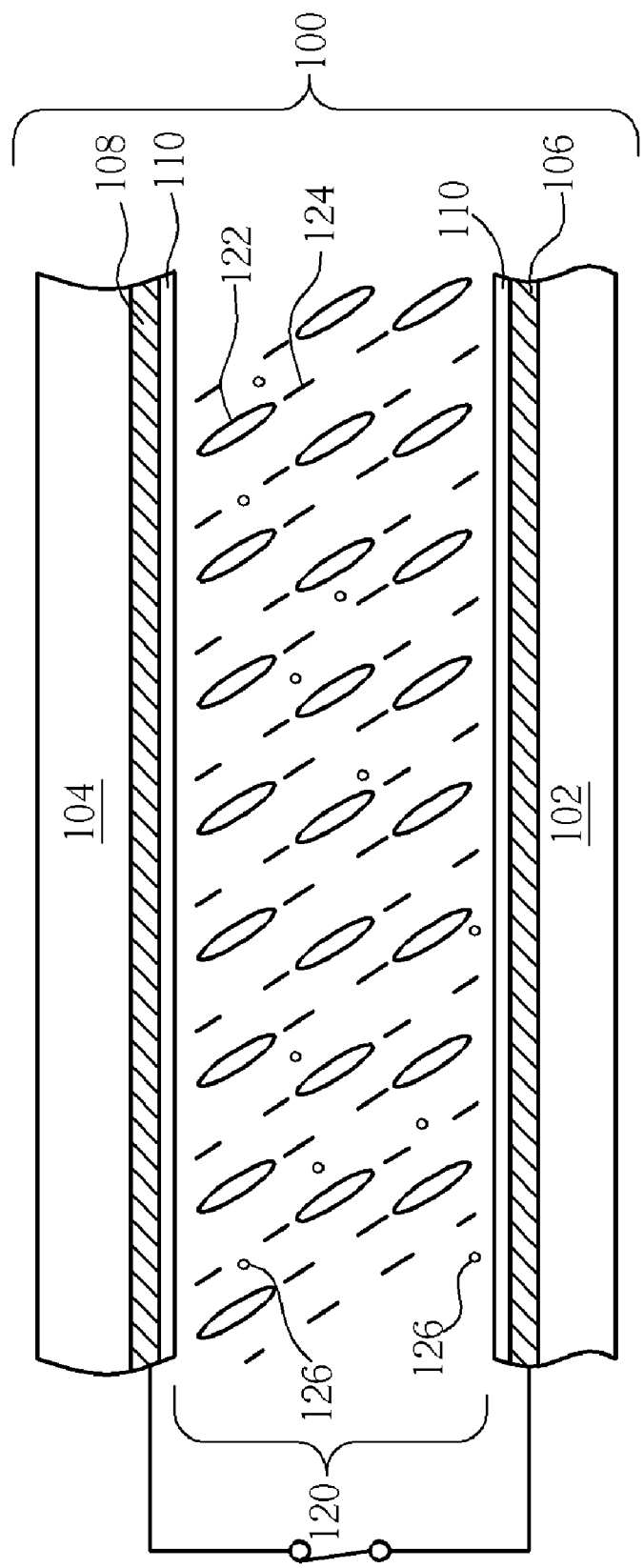
Figure 4:
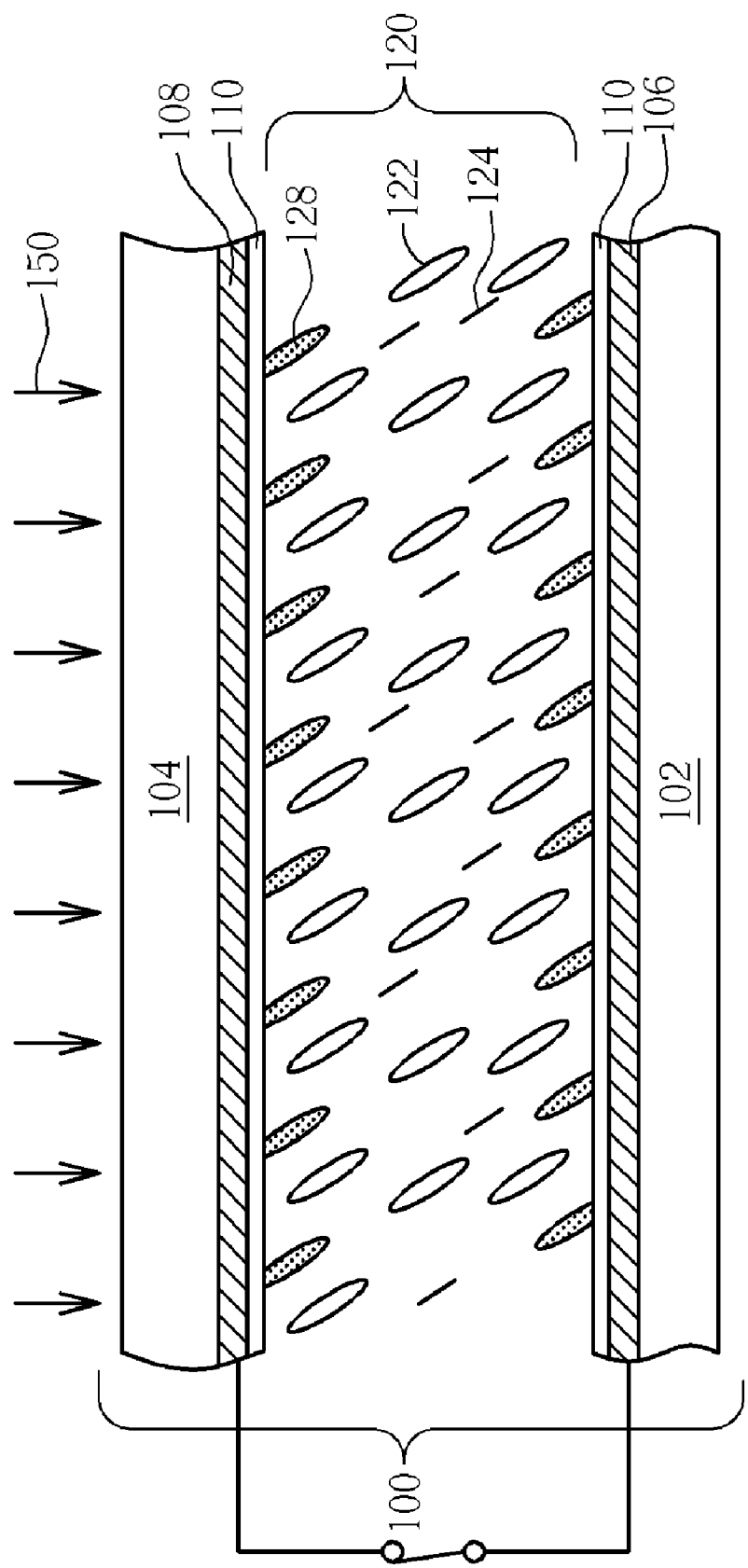

Please refer to FIGS. 3-4. After the sealant 130 is cured, a polymerization alignment process is performed. First, a voltage such as a DC voltage or an AC voltage is repeatedly applied on the conductive layers 106 and 108 to make the LC molecules 122 have a predetermined angle. Then, as shown in FIG. 4, a broadly defined light 150 such as UV light, heat, or heat followed by light is applied on the LCD 100 while the voltage is stilled applied on. Accordingly the reactive monomers 124 are polymerized along the predetermined angle of the LC molecules 122 and phase separation is introduced. Thus polymers 128 are formed on the alignment layer 110 located on the upper substrate 104 and the lower substrate 102. After the voltage is removed, the LC molecules 122 are made to have a pre-tilt angle along a direction provided by the polymers 128.

Figure 5:
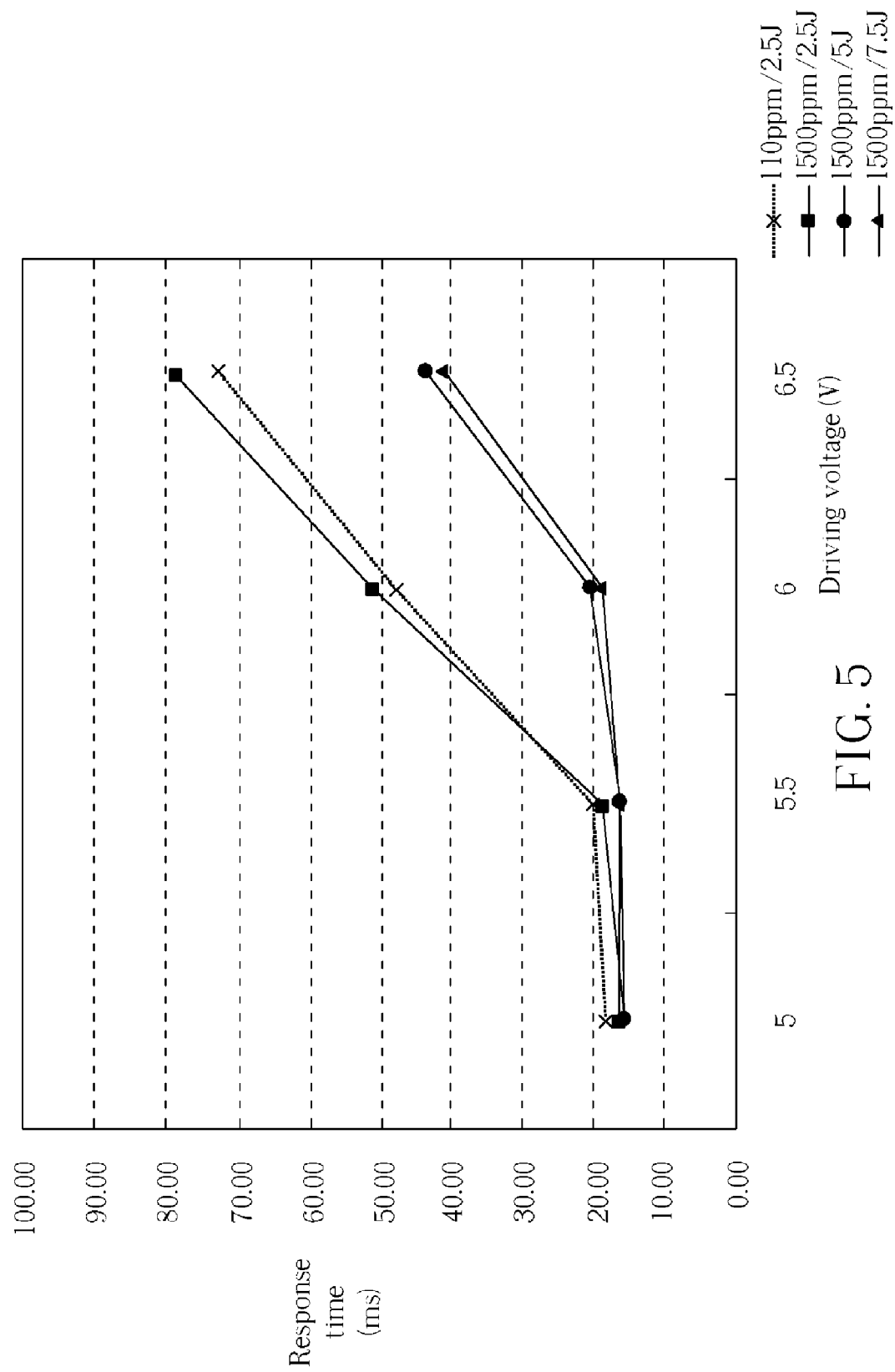
FIG. 5 is a curve diagram of a relationship of response time of the LCD versus difference concentrations of the inhibitor in the LC medium and different light energies used in the polymerization alignment process.

It is noteworthy that according to the method provided by the present invention, the inhibitor 126 quenches polymerization of the reactive monomers 124, in other words, the inhibitor 126 makes the reactive monomers 124 excessively stable during the polymerization alignment process, and therefore a longer response time may be created in the fabricated LCD 100. However, an energy of the light 150 used in the polymerization alignment process is adjustable by adjusting light intensity or a duration that the light 150 applied on the LCD 100 to avoid such adverse influence. For example, the duration that the light 150 applied on the LCD 100 is extended to about 3 minutes. Consequently the inhibitor 126 of the LC medium 120 is quickly consumed by such adjustment. Please refer to FIG. 5, which is a curve diagram of a relationship of the response time of the LCD versus difference concentrations of the inhibitor in the LC medium 120 and different light energy used in the polymerization alignment process. As shown in FIG. 5, when the concentration of the inhibitor 126 is 1500 ppm, the response time of the LCD 100 can be substantially reduced by increasing energy of the light 150 to 5 Joules (J). In conclusion, though the inhibitors 126 increase stability of the LC medium 120 and make polymerization of the reactive monomers 124 inferior in the polymerization alignment process or at initial stage of the polymerization alignment process, it can be overcome by adjusting energy of the light 150 such as adjusting light intensity or a duration that the light 150 applied on the LCD 100. Because the inhibitor 126 is consumed quickly by such adjustment during the polymerization alignment process, the polymerization of the reactive monomers 124 can be improved and thus the response time of the LCD 100 is improved even to be superior to conventional requirements.

Compared with prior art, due to the inhibitor added in the LC medium for the polymerization alignment process, undesired polymerization of the reactive monomers 124 before the polymerization alignment process is effectively prevented, thus stability of the LC medium is substantially improved. Furthermore, according to the method for manufacturing a LCD provided by the present invention, the inhibitor can be quickly consumed during the polymerization alignment process by adjusting process parameters of the polymerization alignment process, therefore the inhibitor added in the LC medium would not influence optical performance of the LC medium in the polymerization alignment process. Additionally, the response time of the LCD even can be made superior to conventional requirement by adjusting process parameter. In summary, the economical and effective method for manufacturing a liquid crystal display provided by the present invention is characterized by adding an inhibitor in a proper concentration into the LC medium therefore polymerization of the reactive monomers before the polymerization alignment process is reduced without influencing optical performance and reliability of the LCD, and quality of LCD product is consequently improved.

Those skilled in the art will readily observe that numerous modifications and alterations of the device and method may be made while retaining the teachings of the invention.

What is claimed is:

1. A liquid crystal (LC) medium for polymerization alignment process in a liquid crystal display, comprising:
   a plurality of liquid crystal (LC) molecules;
   a plurality of reactive monomers; and
   at least one inhibitor at a concentration in a range of 0.01-1% wt of the reactive monomers, wherein the inhibitor comprises at least a compound of formula (1):

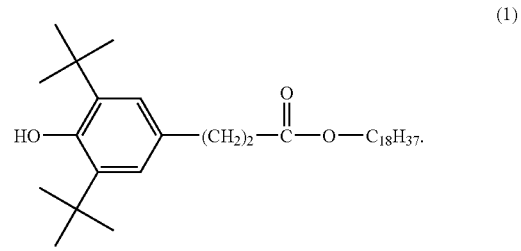

2. The LC medium of claim 1, wherein the reactive monomers are photo-polymerizable reactive monomers or thermal-polymerizable reactive monomers.

3. The LC medium of claim 2, wherein the reactive monomers comprise compounds of formula (2) or (3):

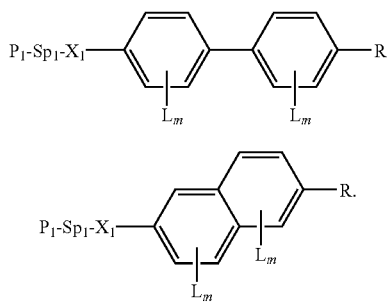

4. The LC medium of claim 3, wherein $P_1$ independently is a polymerizable group.

5. The LC medium of claim 4, wherein $P_1$ independently comprises acrylate or methacrylate.

6. The LC medium of claim 3, wherein $SP_1$ independently is a spacer group or a single group.

7. The LC medium of claim 3, wherein $X_1$ independently is —O—, —S—, —OCH$_2$—, —CO—, —COO—, —OCO—, —CO—N$^o$R—, —N$^o$R—CO—, —OCH$_2$—, —SCH$_2$—, —CH$_2$S—, —CH=CH—COO—, —OCC—CH=CH—, or a single bond.

8. The LC medium of claim 3, wherein $L_m$ independently is F, Cl, CN, alkyl having 1 to 7 carbon atoms, alkylcarbonyl having 1 to 7 carbon atoms, alkoxycarbonyl having 1 to 7 carbon atoms, or alkylcarbonyloxy having 1 to 7 carbon atoms, and $m \geq 1$.

9. The LC medium of claim 8, wherein when $L_m$ is alkyl having 1 to 7 carbon atoms, alkylcarbonyl having 1 to 7 carbon atoms, alkoxycarbonyl having 1 to 7 carbon atoms, or alkylcarbonyloxy having 1 to 7 carbon atoms, one or a plurality of its hydrogen atom is replaceable with fluorine atom or chlorine atom.

10. The LC medium of claim 3, wherein R independently is —H, —F, —Cl, —CN, —SCN, —SF$_5$H, —NO$_2$, single bond having 1 to 12 carbon atoms, branched-chain alkyl having 1 to 12 carbon atoms, or —X$_2$-Sp$_2$-P$_2$, wherein:
  $X_2$ is independently —O—, —S—, —OCH$_2$—, —CO—, —COO—, —OCO—, —CO—N$^o$R—, —N$^o$R—CO—, —SCH$_2$—, —CH$_2$S—, —CH=CH—COO—, —OOC—CH=CH—, or a single bond;
  Sp$_2$ is independently a spacer group or a single group; and
  P$_2$ is independently a polymerizable group.

11. The LC medium of claim 1, wherein the LC molecules comprise a compound of formula (4), (5), (6), or (7):

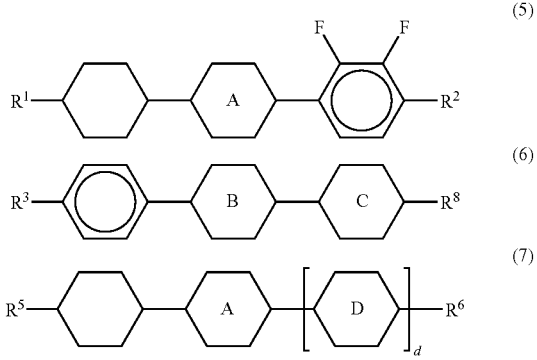

wherein $R^1$, $R^2$, $R^3$, $R^4$ and $R^6$ independently are an alkyl having 1 to 12 carbon atoms, in which 1 or 2 non-adjacent CH$_2$ group of the alkyl is replaceable with —O—, —CH=CH—, —CO—, —OCO—, or —COO—, in such a way that oxygen atoms are not linked directly to one another;
$R^5$ is alkenyl having 2 to 8 carbon atoms;
d is 0 or 1;

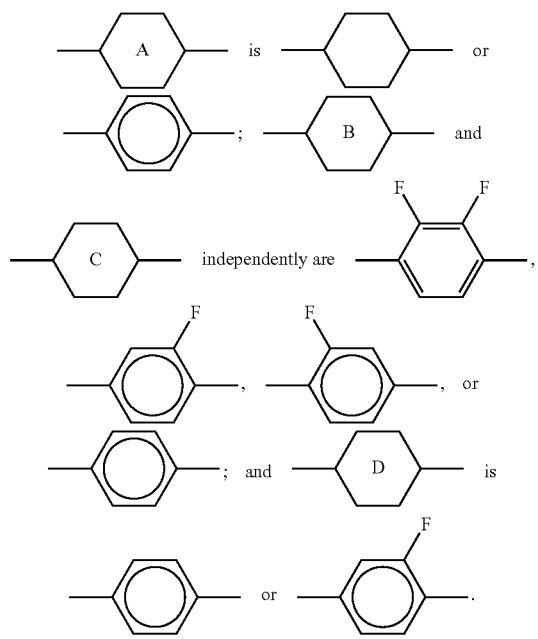

12. The LC medium of claim 1, further comprising at least one initiator.

13. A method for manufacturing a liquid crystal display (LCD), comprising:
  providing an upper substrate and a lower substrate;
  forming a sealant between the upper substrate and the lower substrate;
  filling a LC medium in between the upper substrate and the lower substrate; and
  performing a polymerization alignment process;
  wherein the LC medium comprises:
  a plurality of LC molecules;
  a plurality of reactive monomers; and at least one inhibitor at a concentration in a range of 0.01-1% wt of the reactive monomers, wherein the inhibitor comprises at least a compound of formula (1):

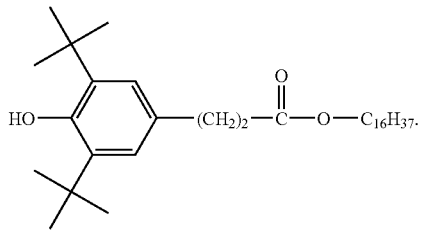
(1)

14. The method of claim 13, wherein the LC medium is filled in between the upper substrate and the lower substrate by a liquid crystal injection process or a one drop fill (ODF) process.

15. The method of claim 14 further comprising performing a sealant curing process after the LC medium is filled in between the upper substrate and the lower substrate.

16. The method of claim 14, wherein the inhibitor is consumed for preventing the reactive monomers from polymerization during the sealant curing process.

17. The method of claim 13, wherein a voltage is applied to make the LC molecules have a predetermined angle in the polymerization alignment process.

18. The method of claim 17, wherein a light is applied to the LCD to make the reactive monomer polymerize along the predetermined angle of the LC molecules and make the LC molecules have a pre-tilt angle in the polymerization alignment process.

19. The method of claim 18, wherein an energy of the light used in the polymerization alignment process is adjustable.

20. The method of claim 19, wherein the energy of the light is adjusted by adjusting light intensity of the light or adjusting a duration that the light applied to the LCD.

21. The method of claim 13, wherein the reactive monomers are photo-polymerizable reactive monomers or thermal-polymerizable reactive monomers.

22. The method of claim 21, wherein the reactive monomers comprise a compound of formula (2) or (3):

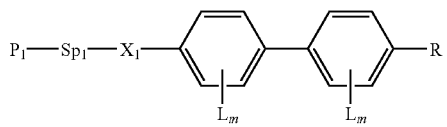
(2)

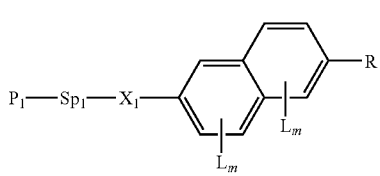
(3)

wherein $P_1$ independently is a polymerizable group comprising acrylate or methacrylate; $SP_1$ independently is a spacer group or a single group; $X_1$ independently is —O—, —S—, —OCH$_2$—, —CO—, —COO—, —OCO—, —CO—N$^0$R—, —N$^0$R—CO—, —OCH$_2$—, —SCH$_2$—, —CH$_2$S—, —CH=CH—COO—, —OCC—CH=CH—, or a single bond; $L_m$ independently is F, Cl, CN, alkyl having 1 to 7 carbon atoms, alkylcarbonyl having 1 to 7 carbon atoms, alkoxycarbonyl having 1 to 7 carbon atoms, or alkylcarbonyloxy having 1 to 7 carbon atoms, and $_m \geq 1$, and when $L_m$ is alkyl having 1 to 7 carbon atoms, alkylcarbonyl having 1 to 7 carbon atoms, alkoxycarbonyl having 1 to 7 carbon atoms, or alkylcarbonyloxy having 1 to 7 carbon atoms, one or a plurality of its hydrogen atom is replaceable with fluorine atom or chlorine atom.

23. The method claim 22, wherein R independently is —H, —F, —Cl, —CN, —SCN, —SF$_5$H, —NO$_2$, single bond having 1 to 12 carbon atoms, branched-chain alkyl having 1 to 12 carbon atoms, or —X$_2$-Sp$_2$-P$_2$, wherein:

$X_2$ is independently —O—, —S—, —OCH$_2$—, —CO—, —COO—, —OCO—, —CO—N$^0$R—, —N$^0$R—CO—, —SCH$_2$—, —CH$_2$S—, —CH=CH—COO—, —OOC—CH=CH—, or a single bond;

Sp$_2$ is independently a spacer group or a single group; and

P$_2$ is independently a polymerizable group.

24. The method claim 13, wherein the LC molecules comprise a compound of formula (4), (5), (6), or(7):

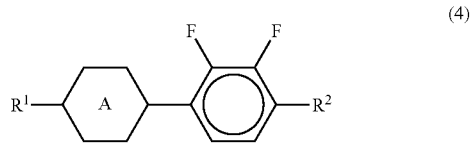
(4)

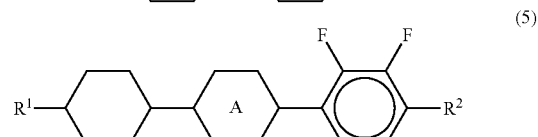
(5)

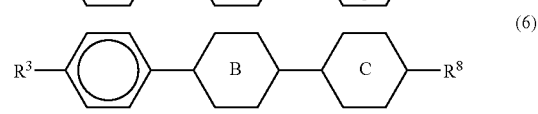
(6)

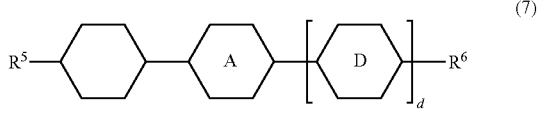
(7)

wherein R$^1$, R$^2$, R$^3$, R$^4$ and R$^6$ independently are an alkyl having 1 to 12 carbon atoms, in which 1 or 2 non-adjacent CH$_2$ group of the alkyl is replaceable with —O—, —CH=CH—, —CO—, —OCO—, or —COO—, in such a way that oxygen atoms are not linked directly to one another;

R$^5$ is alkenyl having 2 to 8 carbon atoms;

d is 0 or 1;

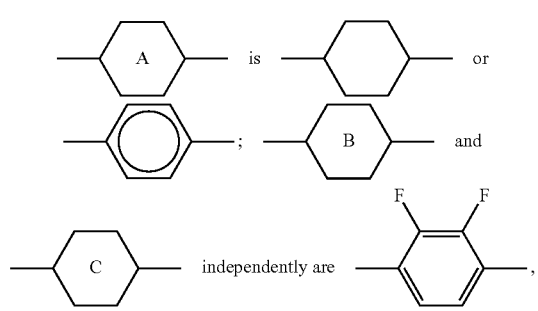

-continued
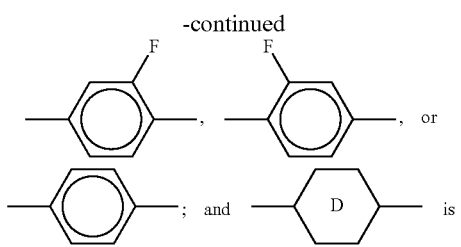
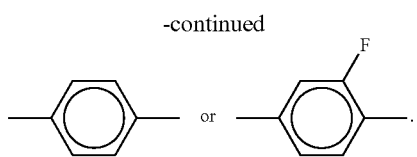
25. The method of claim 13, wherein the LC medium further comprises at least one initiator.